United States Patent [19]

Bridges

[11] 4,385,227

[45] May 24, 1983

[54] AUTOMATIC DELAY AND HIGH VELOCITY SENSING SYSTEM

[76] Inventor: Danny E. Bridges, P.O. Box 2607, TUSLOG DET 118 A.P.O., N.Y. 09224

[21] Appl. No.: 127,689

[22] Filed: Mar. 6, 1980

[51] Int. Cl.³ .............................................. G06M 3/02
[52] U.S. Cl. ........................................ 377/2; 324/178; 377/9; 377/20; 377/45
[58] Field of Search ......... 235/92 CT, 92 EV, 92 PE, 235/92 FQ, 92 V, 92 T, 92 TF; 324/178, 160; 364/565, 525

[56] References Cited

U.S. PATENT DOCUMENTS

| | | | |
|---|---|---|---|
| 2,382,981 | 8/1945 | Edgerton | 73/167 |
| 2,989,695 | 6/1961 | Heaney | 324/178 |
| 3,158,854 | 11/1964 | Keen et al. | 235/92 FQ |
| 3,492,570 | 1/1970 | Tanzman | 324/178 |
| 3,497,683 | 2/1970 | Jordan et al. | 235/92 CC |
| 3,824,463 | 7/1974 | Oehler | 324/179 |
| 3,914,580 | 10/1975 | Watson et al. | 235/92 T |
| 4,031,373 | 6/1977 | Beckwith | 235/92 T |
| 4,296,471 | 10/1981 | Goux | 235/92 FQ |

Primary Examiner—Joseph M. Thesz
Attorney, Agent, or Firm—Donald J. Singer; Willard Matthews

[57] ABSTRACT

A circuit consisting of five cascaded binary coded decimal, UP-DOWN circuits with associated gates, a first input causes the counters to count up, at a 10 Mhz rate until any second input, which latches into memory the accumulated time in the counters, and causes the counters to count down at 5 Mhz rate, when the counters reach zero an output pulse, suitable for triggering photo flash strobes is generated.

10 Claims, 4 Drawing Figures

AUTOMATIC DELAY AND HIGH VELOCITY SENSING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a circuit and system for sensing the velocity of a moving object and producing a triggering pulse which is a function of distance regardless of variations in velocity.

The invention has particular application to the field of ballistics, however it will function in any situation where a moving object is able to trip two sensors and an event is to take place at a known distance from a sensor.

It is customary and well known in the arms industry, that one method of evaluating arms and ammunition is by firing a projectile through a pair of sensors. A first sensor will normally start a clock while a second sensor will stop the clock, the elapsed time is used to calculate the velocity of the projectile. Additionally, occasions arise where the projectile is to be photographed or X-rayed along the flight path. Ordinarily the general velocity of the projectile is known and a sensor is set up which triggers an instrument after an elapsed time period.

One of the major drawbacks to the aforementioned system is that due to the variations in velocity of various projectiles it is difficult to produce high quality photographs in each instance. When using ultra high speed photography which is necessary in the field of ballistics, an error of a few micro seconds could mean the difference between a good photograph, a bad photograph or perhaps no photograph at all.

Consequently, one of the major concerns is that of positioning the object to be photographed relative to the camera. The techniques of high speed photography utilize extremely short duration, low intensity light pulses with an open camera aperture. Under these conditions focus is critical in that due to the limited depth of field of the camera, where variations in the objects position may create different degrees of distortion.

The system described herein solves the object position problem by sensing the velocity of the object and triggering a light source when the object is at a predetermined position regardless of object velocity.

SUMMARY OF THE INVENTION

The invention relates to a high speed object detection and velocity sensing system. The system is particularly adapted for triggering a source of illumination in high speed ballistic photography.

In the invention, cascaded up-down binary coded decimal counters are used to measure the elapsed time of a high speed projectile traveling in flight between two detectors spaced a predetermined distance apart. The detectors may be luma-line detection screens or other suitable devices positioned in the flight path of the projectile. A counter start signal is generated as the projectile passes through the first detector causing the counters to count up at a predetermined rate. A counter stop signal generated as the projectile passes through the second detector causes the counter to stop, whereupon the counter automatically reverses and counts down.

The count down rate is selected at half the count up rate so that the counter reaches zero when the projectile reaches a predetermined distance from the second detector equal to twice the distance between the detectors. The source of illumination is positioned at the predetermined distance from the second detector and triggered by the counter at zero to illuminate the object and expose the film in the camera.

It is therefore an object of the invention to provide a new and improved automatic delay and velocity sensing system.

It is another object of the invention to provide a new and improved automatic delay and velocity sensing system that is completely automatic.

It is a further object of the invention to provide a new and improved automatic delay and velocity sensing system that triggers a pulse based upon an objects position regardless of velocity.

It is still another object of the invention to provide a new and improved automatic delay and velocity sensing system that provides a digital output of time whereby velocity may be calculated.

It is still a further object of the invention to provide a new and improved automatic delay and velocity sensing system that simplifies camera positioning and focus in ballistic testing systems.

It is another object of the invention to provide a new and improved system for examining objects in motion.

It is another object of the invention to provide a new and improved system for photographing objects moving at high speed.

It is another object of the invention to provide a new and improved system for examining moving objects that is simple and low in cost.

It is another object of the invention to provide a new and improved system for examining objects in motion that is more accurate and more reliable than any hitherto known system.

These and other advantages, features and objects of the invention will become more apparent from the following description taken in connection with the illustrative embodiment in the accompanying drawings.

DESCRIPTION OF THE PREFERRED EMBODIMENT

Figure 1:
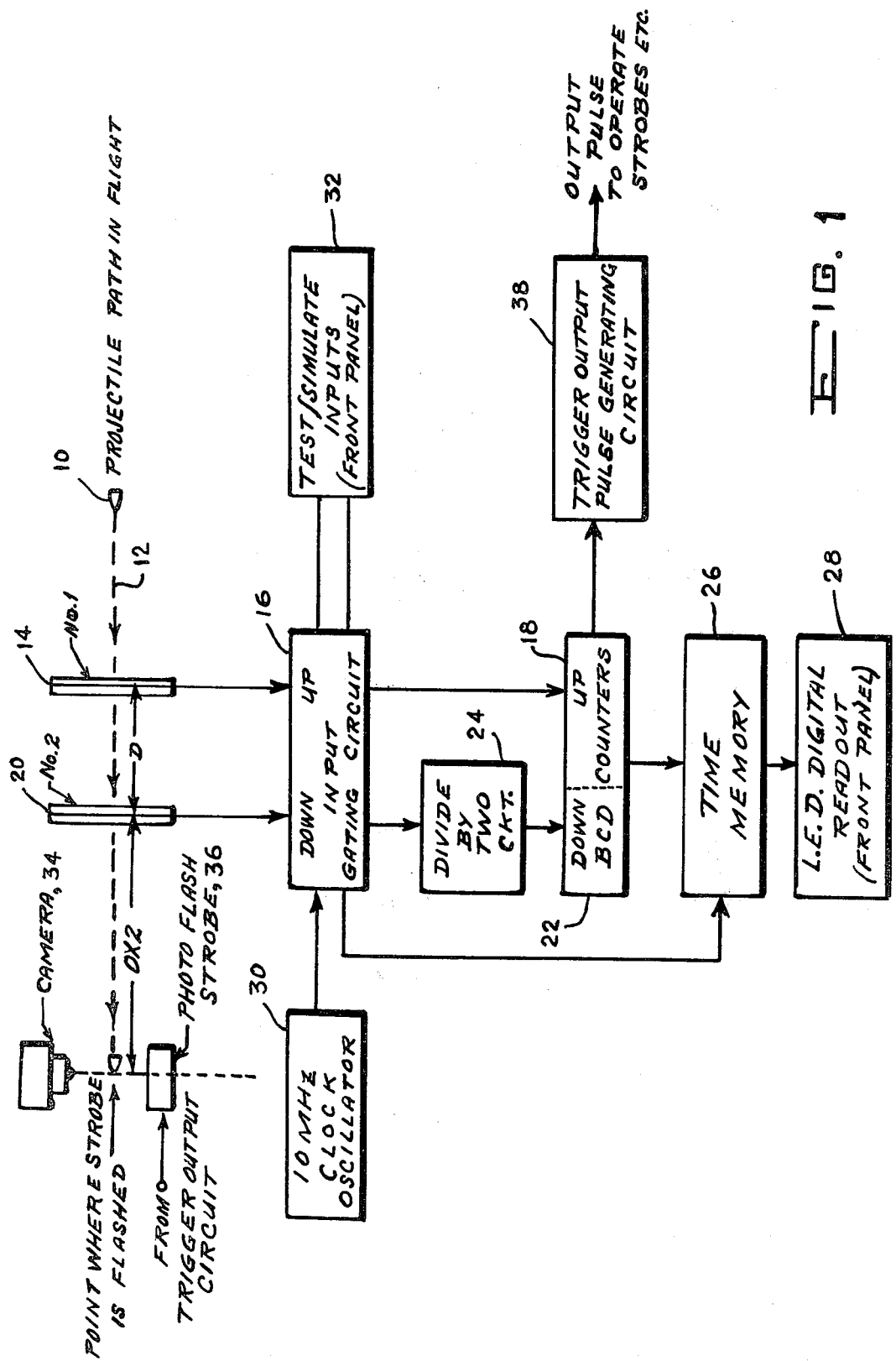
FIG. 1 is a block diagram of the system of the invention.

Referring now to FIG. 1 a projectile 10 follows flight path indicated by the dashed line 12. A first sensing device 14 such as a luma-line detection screen is connected to gating circuit 16 and activates an UP counter 18. Spaced from the first detector at a distance 'D' is a second detector 20 similar to the first detector. Detector 20 is connected to the gating circuit 16 and functionally stops the UP counter and starts the DOWN counter 22. Between the gate circuit 16 and DOWN counter 22 is a divide by two circuit 24 causing counter 22 to count DOWN at half the rate counter 18 counted UP. A signal from gating circuit 16 activates time memory 26 which displays time on the LED digital readout 28 mounted on an appropriate panel.

A 10 Mhz clock oscillator 30 provides a timing signal for the UP-DOWN counters. A test-simulate input 32 is provided to the gating signal via an appropriate panel.

The projectile continues along flight path 12 until it reaches a distance 2×D from the second detection device. Positioned at 2×D is camera 34 and an appropriate illuminating device 36 such as a micro-flash. It should be noted that lasers and flash X-ray devices would be equally appropriate. The flash unit is connected to the trigger output pulse generating circuit 38 which receives as input, output from the UP-DOWN counters.

Figure 2:
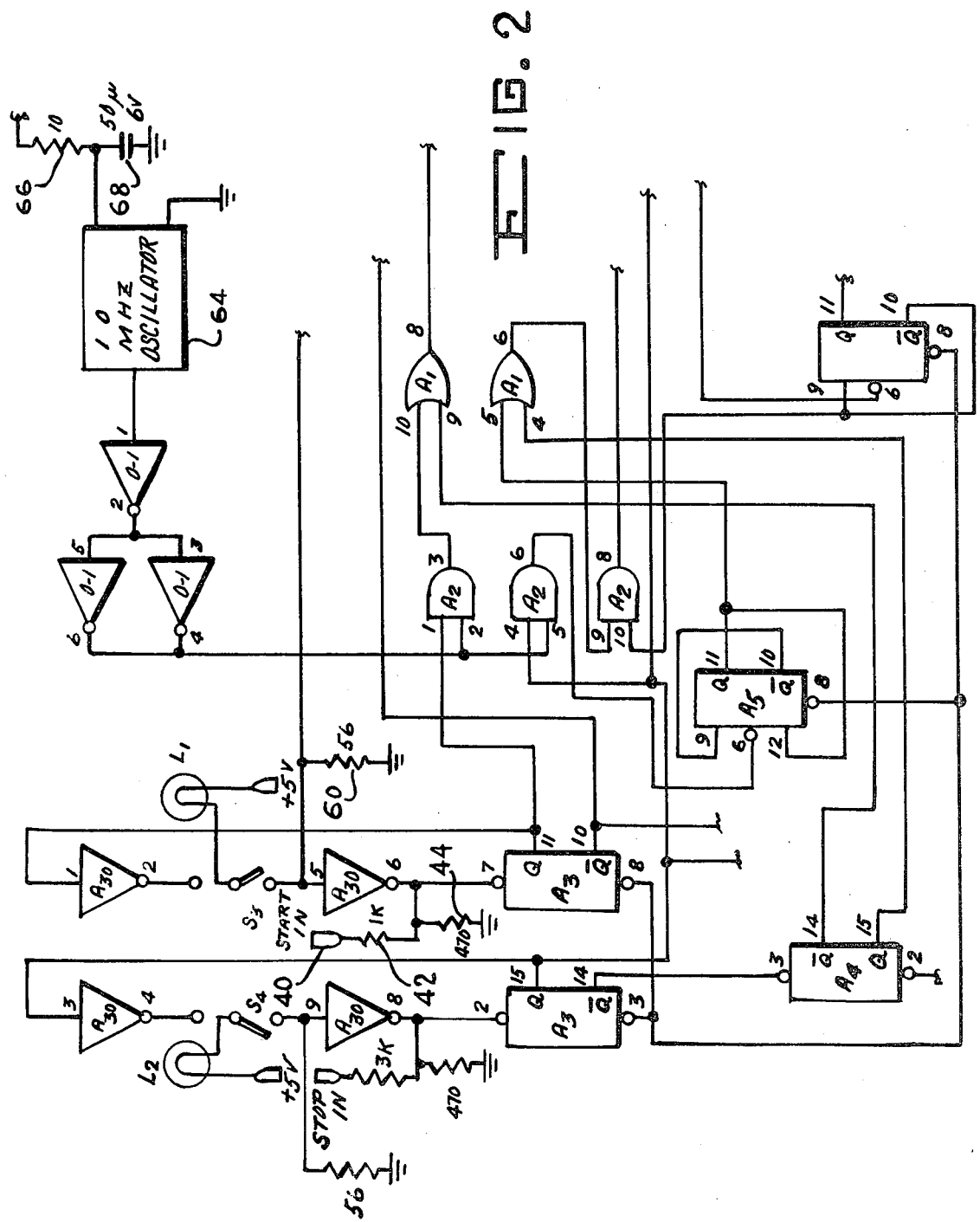
FIG. 2 is a circuit diagram showing generally the input portion of the system.
Figure 3:
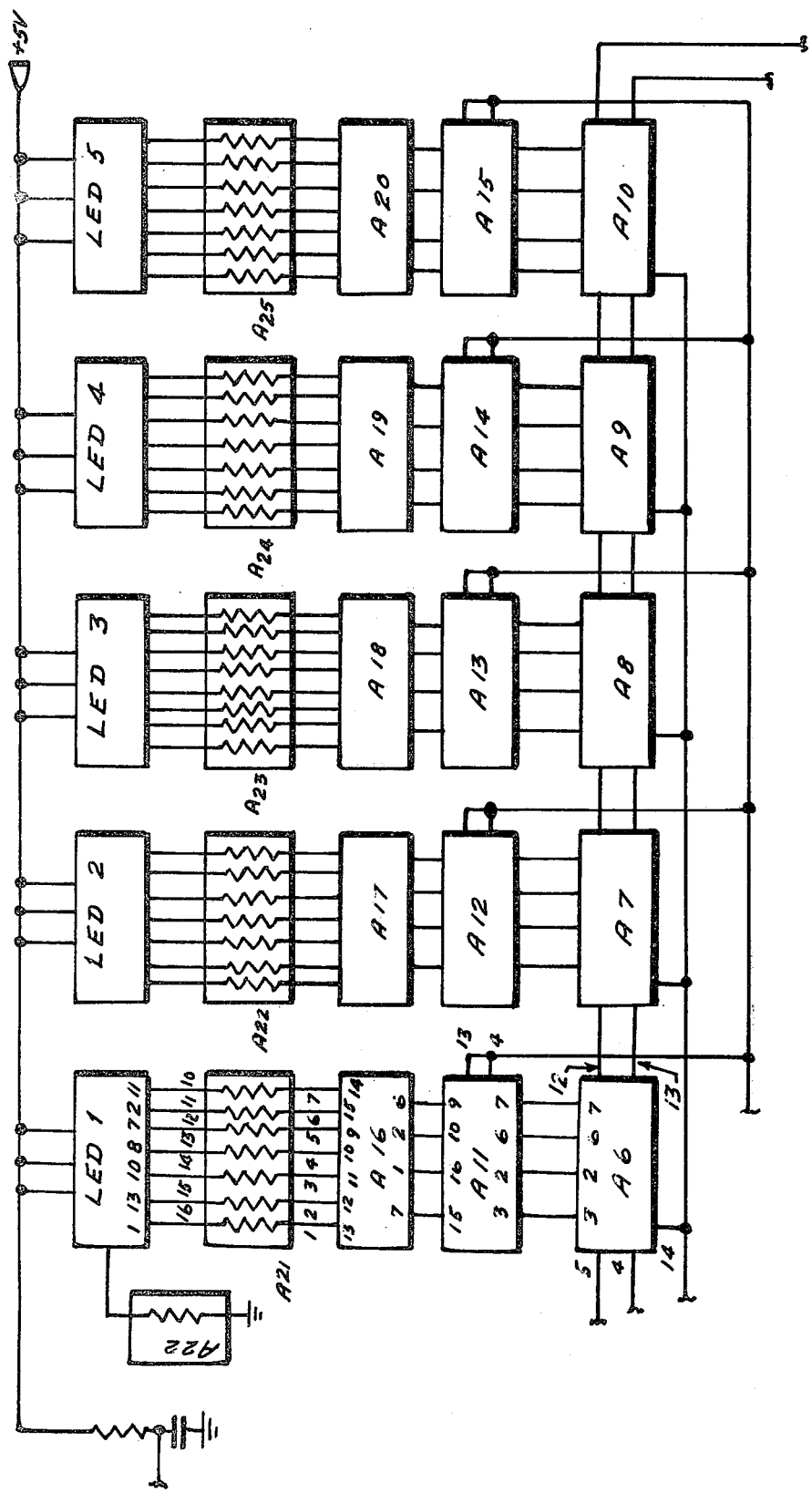
FIG. 3 is a circuit diagram showing generally the counter portion of the system.
Figure 4:
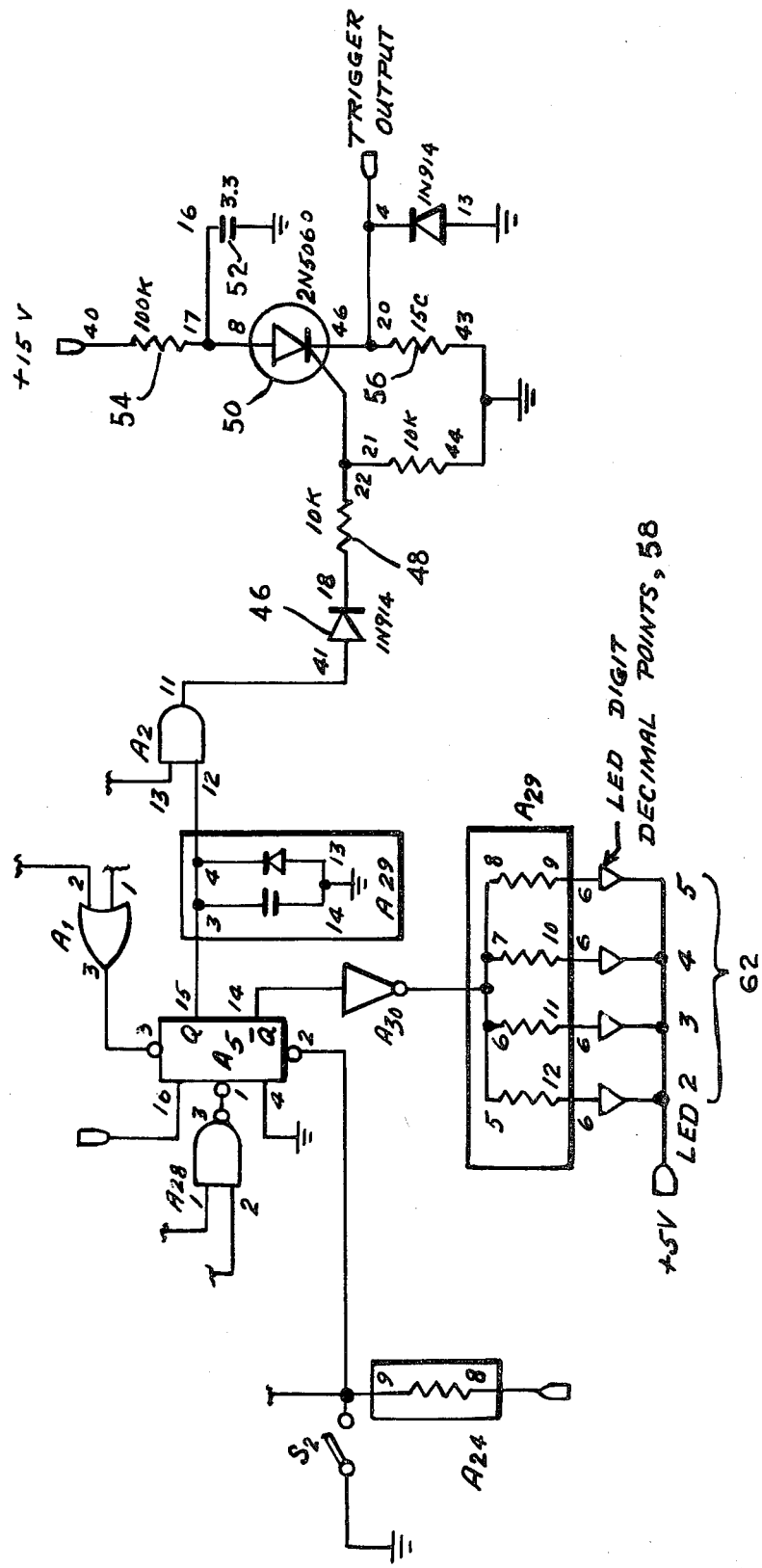
FIG. 4 is a circuit diagram showing generally the output of the system.

Operation of the circuit is shown in FIGS. 2, 3 and 4. Circuit operation begins with a clear on the clear input line, or by depressing a clear switch on a control panel. When this negative going pulse is received, master/slave flip flop points A3-14, A3-10, A4-14, A4-10, A5-10, and A5-15 all go high. When A3-10 goes high, a high is applied to UP-DOWN counter point A6-14 through UP-DOWN counter point A10-14, clearing the counters and the memory 26. At this point all components are properly set for operation.

The automatic delay works on the simple premise of an UP-DOWN counter. Two detection devices (14,20) are placed a predetermined distance apart. As an object moves through the first detector screen, the output from the screen is amplified and applied to the input 40 in the circuit. The 1 K ohm (42) and 470 ohm (44) resistors from a voltage divider that reduces the amplitude of the input pulse to zero volts at A3-7. When this pulse is applied, A3-11 goes high and applies a high to A2-1. A low is also aplied to A6-14, allowing the counters to count when the clock pulses are received. AND gate (A2-2) has a 10 Mhz square wave applied, so A2-3 follows the 10 Mhz rate. This signal is applied to OR gate A1-10. A1-9 has a low level applied from A4-15, so it also follows the 10 Mhz rate. A6 through A10 are cascaded UP-DOWN counters. A6-5 is connected to A1-8 and therefore has 10 Mhz applied to the count UP circuit. A6-4 is held high by A2-8 until a stop pulse is received from the second screen. Therefore the counters count UP at a 10 Mhz rate. Upon receipt of a stop pulse from the second screen to (2), A3-15 goes high. At the same time, A3-14 goes low, setting A4-14 low and A4-15 high. A3-15 going high also latches the elapsed time in the counters into the memory. This is accomplished by pins 4-13 of A-11 through A-15 (bistable latch circuits) being held high. The high from A3-15 is also applied to A2-4. A2-5 has a 10 Mhz square wave applied so A2-6 follows the 10 Mhz rate. A2-6 is applied to A5-6, a divide by two circuit. A5-11 is toggeling at a 5 Mhz rate at this time, and is applied to A2-9. A2-10 has a high applied from A4-10 and so it follows the 5 Mhz rate. This Mhz is applied from A2-8 to A6-4, but the counters now count down. A6-5 has a high applied from A1-8. A1-9 has a high applied from A4-15. This high OR gae A1-9 holds A1-8 high so as a high is applied to A6-5 continuously after a stop screen input. When the down counter counts down to zero, A10-13 goes low. This low is applied to A4-6 and causes a high output on A4-11. This is applied to A2-13. If a stop pulse was not received before the start pulse, and if the counters have not over-run their maximum count, a high is also applied to A2-12. A2-11 then goes high applying a high to a diode 46, a 10 K ohm resistor 48 and to the gate of a 2N5060 silicon controlled rectifier 50. A 3.3 ufd. capacitor 52 has been charged to 15 volts through a 100 K ohm resistor 54 and is dumped by the SCR (50) across a 150 ohm resistor 56. This four millisecond pulse is then taken as the output to activate the photographic light device. This pulse has a very quick rise time to prevent a prolonged delay till the output.

Due to the divide by two circuit in the count down clock circuit, the object will move a distance past the second screen equal to twice the distance between the two screens. This feature was incorporated into the device to prevent the second screen from exposing the film if a light-emitting detection device was used.

A lockout circuit is incorporated to prevent the circuit from producing an output pulse if an erroneous signal is received from one of the screens. If a stop pulse is received before a start pulse, the circuit will light all the decimal points on the panel L.E.D.s 58. If a start pulse is received too early, the counters will overrun. When the counters overrun, the decimal points will be lit also, but numbers will be displayed on the panel L.E.D.s instead of zeros as in the previous condition.

If a stop pulse is received before a start pulse, A3-15 will go high and A3-14 low. The high on A3-15 is applied to NAND gate A28-2. A28-1 is also held high by A3-10. This causes a low output on A28-3 and this is applied to a master/slave flip flop A5-1. A5-15 goes low, inhibiting the output from A2-11.

If a start pulse is received too early, the counters overrun and an output pulse is seen at A10-12. This negative going pulse is seen at A1-2. A1-1 is held low by a 56 ohm resistor 60 connected to ground. It is connected to inverter buffer A30-5. With both inputs low, the output goes low applying low to A5-3. This causes A15-15 to go low, inhibiting the output of A2-11. When A5-14 goes high it is applied to A30-11. With A30-11 high, A30-10 goes low, lighting the digit decimal points on the panel L.E.D.s (62).

The front panel has a set of five L.E.D.s (62) to indicate the elapsed time in the memory. This time, divided into the distance between the two detection screens, will give the velocity of the object. Also on the panel are two indicator/simulator switches, L1 and L2. L1 lights to indicate that a start pulse been received. L2 lights to indicate that a stop pulse has been received. Lamp/switch L1 is connected to the +5 volt supply and to the center of switch S3. In its normal position, switch S3 connects the center with A30-2 which is high until a start pulse is received. When depressed, S3 applies a high to A30-5 which applies a low on A3-7 causing a high output on A3-11, simulating a start input to start the counters. As long as this switch is held depressed a high is also applied to A1-1, inhibiting the overrun lockout circuit. This feature allows for testing the instrument for an output without having to receive inputs from the detection screens. When the switch is allowed to go back to its normal position, L1 is connected to a low and to 5 volts, thereby keeping it lit until a clear pulse is received. Lamp/switch L2 is connected to +5 volts and to the center of switch S4. In its normal position, switch S4 connects its center with A30-4, which is high until a stop pulse is received. When depressed, S4 applies a high to A30-9. This applies a low on A3-2 causing a high output on A3-15, simulating a stop input pulse. A3-15 also applies a high back to A30-3 to cause a low on A30-4. When the switch is allowed to return to its normal position, L2 is connected to a low on S4 center and +5 volts, keeping L2 lit until a clear input is received.

A precision 10 Mhz oscillator (64) is used to provide a very accurate time base. The oscillator is connected to the +5 volt power supply through a 10 ohm resistor 66 for decoupling. A 50 ufd. capacitor is connected to the low side of the resistor to provide further filtering. The output of the oscillator is connected to 01, an inverter buffer. 01-2 is connected to 01-3, and 01-4 is then connected to A2-2 and A2-5. Double buffering was used for better isolation of the oscillator from the circuit. The inverter buffer used for this is a 74L04, a low power integrated circuit, used to minimize loading of the ocscillator.

Although the invention has been described with reference to a particular embodiment, it will be understood to those skilled in the art that the invention is capable of a variety of alternative embodiments within the spirit and scope of the appended claims.

What is claimd is:

1. A system for sensing high velocity moving objects and providing an electrical output pulse as the object passes a point independent of variation in velocity of the object, comprising: first and second means for sensing a moving object and outputting signals in response thereto, a gate circuit connected to said sensors; an oscillator clock outputting a timing signal said oscillator clock being connected to the gate circuit; first and second counting means connected to the gate circuit said first and second counting means being driven by said oscillator clock and being activated by signals from said first and second means for sensing a moving object whereby a signal from the first sensing means will cause the gate circuit to switch the first counting means on, and a signal from the second sensing means will cause the gate circuit to switch the second counting means on and the first counting means off; pulse generating means connected to the second counting means, whereby an output pulse is generated when said second counting means reaches a preselected count; a time memory circuit connected to said first and second counting means for storing the output of said first and second counting means; means for displaying the count of said first and second counting means, and pulse receiving means adapted to be activated by the pulse generating means when said moving object passes a designated point.

2. A system for sensing high velocity moving objects according to claim 1 wherein, said first and second sensing means are luma-line detectors.

3. A system for sensing high velocity moving objects according to claim 1 wherein said first and second counting means include cascade UP-DOWN binary code decimal counters.

4. A system for sensing high velocity moving objects according to claim 1 wherein said first counting means is an UP counter and said second counting means is a DOWN counter.

5. A system for sensing high velocity moving objects according to claim 4 further including means for dividing the oscillator clock timing signal, connected between the gate circuit and the second counting means.

6. A system for sensing high velocity moving objects according to claim 5 wherein, the means for dividing is a divide by two circuit.

7. A system for sensing high velocity moving objects according to claim 1 wherein, said means for displaying are a plurality of light emitting diodes.

8. A system for sensing high velocity moving objects according to claim 1 wherein, said pulse receiving means is a camera-strobe system.

9. A system for sensing high velocity moving objects according to claim 1 wherein, said pulse receiving means is a laser system.

10. A system for sensing high high velocity moving objects according to claim 1 wherein said pulse receiving means is an X-ray photographic test system.

* * * * *